United States Patent
Bouillet et al.

(10) Patent No.: US 6,490,007 B1
(45) Date of Patent: Dec. 3, 2002

(54) ADAPTIVE CHANNEL EQUALIZER

(75) Inventors: Aaron Reel Bouillet, Noblesville, IN (US); Matthew Thomas Mayer, Indianapolis, IN (US); John Sidney Stewart, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/566,159

(22) Filed: May 5, 2000

Related U.S. Application Data

(60) Provisional application No. 60/143,121, filed on Jul. 14, 1999.

(51) Int. Cl.[7] .............................................. H04N 5/21
(52) U.S. Cl. ..................... 348/614; 348/726; 375/232
(58) Field of Search ............................. 348/614, 470, 348/607, 558, 725, 726; 375/229–236, 240.12, 346–350; H04N 5/21

(56) References Cited

U.S. PATENT DOCUMENTS

| | | | | |
|---|---|---|---|---|
| 5,561,468 A | * | 10/1996 | Bryan et al. ................. | 348/469 |
| 5,910,960 A | * | 6/1999 | Claydon et al. ............. | 714/784 |
| 5,940,454 A | * | 8/1999 | McNicol et al. ............ | 375/347 |
| 6,222,592 B1 | * | 4/2001 | Patel .......................... | 348/607 |
| 6,233,295 B1 | * | 5/2001 | Wang ......................... | 348/500 |
| 6,377,312 B1 | * | 4/2002 | Limberg et al. ............... | 348/21 |
| 6,384,858 B1 | * | 5/2002 | Limberg ...................... | 348/21 |
| 6,418,164 B1 | * | 7/2002 | Endres et al. ............... | 348/607 |
| 6,441,843 B1 | * | 8/2002 | Limberg ...................... | 348/21 |

FOREIGN PATENT DOCUMENTS

EP 084007 * 10/1997

* cited by examiner

Primary Examiner—John Miller
Assistant Examiner—Brian Yenke
(74) Attorney, Agent, or Firm—Joseph S. Tripoli; Ronald W. Kurdyla

(57) ABSTRACT

In a receiver for processing a VSB modulated signal containing terrestrial broadcast high definition television information including data packets, the received signal is converted to a digital signal (19), demodulated (22) and equalized by an adaptive channel equalizer (34). An equalized signal is processed by decoding networks including a Reed-Solomon FEC error detecting and correcting network (44). The equalizer filter coefficient step size is dynamically adjusted during the adaption process as a function of the packet error rate. A local microcontroller (60) monitors the packet error rate at the Reed-Solomon error detector and instructs the equalizer to adjust the coefficient step size in a direction to reduce the packet error rate.

5 Claims, 2 Drawing Sheets

ADAPTIVE CHANNEL EQUALIZER

This is a non-provisional application of provisional application Serial No. 60/143,721 of A. R. Bouillet et al., filed Jul. 14, 1999.

FIELD OF THE INVENTION

This invention concerns adaptive channel equalization of an image representative signal which may be processed by an image processing and display device such as a television receiver.

BACKGROUND OF THE INVENTION

The recovery of data from modulated signals conveying digital information in symbol form usually requires three functions at a receiver: timing recovery for symbol synchronization, carrier recovery (frequency demodulation to baseband), and channel equalization. Timing recovery is a process by which a receiver clock (timebase) is synchronized to a transmitter clock. This permits the received signal to be sampled at the optimum point in time to reduce the chance of a slicing error associated with decision-directed processing of received symbol values. Carrier recovery is a process by which a received RF signal, after being frequency downconverted to a lower intermediate frequency passband (e.g., near baseband), is frequency shifted to baseband to permit recovery of the modulating baseband information.

Many digital data communications systems employ adaptive equalization to compensate for the distortion effects of changing channel conditions and disturbances on the signal transmission channel. The equalization process estimates the transfer function of the transmission channel and applies the inverse of the transfer function to the received signal so as to reduce or eliminate the distortion effects. Channel equalization typically employs filters that remove amplitude and phase distortions resulting from a frequency dependent time variant response of the transmission channel, for example, to thereby provide improved symbol decision capability. Equalization removes baseband intersymbol interference (ISI) caused by transmission channel disturbances including the low pass filtering effect of the transmission channel. ISI causes the value of a given symbol to be distorted by the values of preceding and following symbols, and essentially represents symbol "ghosts" since ISI includes advanced and delayed symbols with respect to a reference symbol location in a given decision region.

An adaptive equalizer is essentially a digital filter with an adaptive response to compensate for channel distortions. Several well-known algorithms are available for adapting the filter coefficients and thereby the filter response to converge the equalizer. In the process of converging the equalizer coefficients, large step sizes are typically used to allow the coefficients to converge faster during an initial adaptation stage, while small step size changes are used at other times to prevent the coefficient values from changing rapidly. The present invention is directed to a process that supports the efficient use of such step size changes.

SUMMARY OF THE INVENTION

In accordance with the principles of the present invention, adaptive equalization is facilitated by dynamically changing the equalizer filter coefficient step size during the adaption process as a function of the packet error rate such as may be evidenced by the output of an FEC error detecting and correcting network.

DETAILED DESCRIPTION OF THE DRAWING

Figure 1:
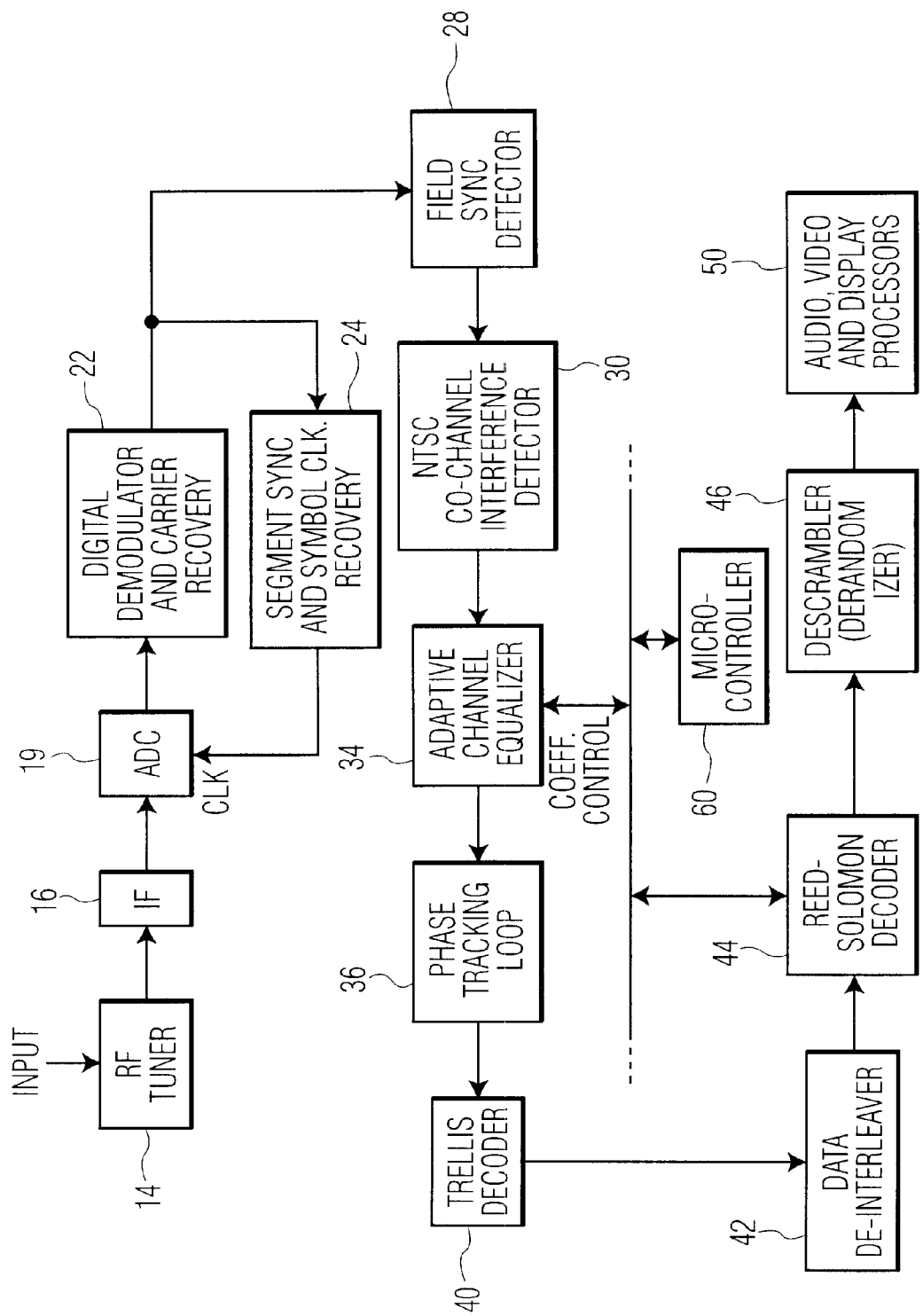
FIG. 1 is a block diagram of a portion of a high definition television (HDTV) receiver including an adaptive equalizer according to the principles of the present invention.

In FIG. 1, a terrestrial broadcast analog Input HDTV signal is processed by an input network 14 including radio frequency (RF) tuning circuits and an intermediate frequency (IF) processor 16 for producing an IF passband output signal, and appropriate automatic gain control (AGC) circuits. In this embodiment the received signal is a carrier suppressed multi-level 8-VSB modulated signal in accordance with the ATSC terrestrial broadcast standard adopted in the United States. To simplify the Figure, timing signals for clocking the illustrated functional blocks are not shown.

The passband IF output signal from unit 16 is converted to a digital symbol datastream by an analog to digital converter 19. The output digital datastream from ADC 19 is demodulated to baseband by a demodulator/carrier recovery network 22. This is done by a phase locked loop in response to the small reference pilot carrier in the received VSB datastream. Unit 22 produces an output I-phase demodulated symbol datastream. Unit 22 may include a demodulator of the type described in the Grand Alliance system specification, or of the type described in copending U.S. patent application Ser. No. 09/140,257 of T. J. Wang filed Aug. 26, 1998.

Associated with ADC 19 is a segment sync generator and symbol clock recovery network 24. Network 24 recovers the repetitive data segment sync components of each data frame from the received random data. The segment syncs are used to regenerate a properly phased clock, e.g., 10.76 Msymbols/sec, which is used to control the datastream symbol sampling by analog to digital converter 19.

Unit 28 detects the data field sync component by comparing every received data segment with an ideal field reference signal stored in memory in the receiver to provide field synchronization. NTSC co-channel interference detection and rejection are performed by unit 30. Afterwards, the signal is adaptively equalized by channel equalizer 34 which operates in accordance with the principles of the present invention as will be discussed. Equalizer 34 may be one of several types, such as the type described in the ATSC HDTV System Specification and in an article by W. Bretl et al., "VSB Modem Subsystem Design for Grand Alliance Digital Television Receivers," IEEE Transactions on Consumer Electronics, August 1995.

Equalizer 34 corrects channel distortions, but phase noise randomly rotates the symbol constellation. Phase tracking network 36 removes the residual phase and gain noise in the output signal from equalizer 34, including phase noise which has not been removed by the preceding carrier recovery network in response to the pilot signal. When signal acquisition begins, adaptive equalizer 34 operates in a blind mode using a known blind equalization algorithm such as the constant modulus algorithm (CMA), for example. After some time has elapsed, e.g., 50 ms, the equalizer output is considered to be good enough to permit equalizer 34 to operate in a steady-state decision-directed mode.

The phase-corrected signal from equalizer 34 is trellis decoded by unit 40, then de-interleaved by unit 42. Decoded and de-interleaved data packets from unit 40 are error detected and corrected by a forward error correcting (FEC) unit 44, e.g., a Reed-Solomon error detecting and detecting network. Error corrected packets from unit 44 are descrambled (de-randomized) by unit 46 using well known procedures. Microcontroller 60 provides appropriate timing control and clock signals for other elements of the system and also serves as a data communications link between the networks of the system. Error corrector 44 and microcontroller 60 cooperate to control the operation of equalizer 34 in accordance with the principles of the present invention, as will be discussed. Afterwards, a decoded datastream is subjected to audio, video and display processing by unit 50.

In accordance with the principles of the present invention, the step size of the equalizer filter coefficients during the coefficient updating process is changed as a function of the packet error rate as determined by a measurement at the output of FEC unit 44. This measurement is performed within the FEC unit itself in accordance with the well-known FEC algorithm which knows when a packet contains more errors than can be corrected. The step size setting is determined once at signal acquisition, then is held until another acquisition is performed. The packet error rate is monitored by microcontroller 60. It is herein recognized that the packet error rate is a direct and accurate measure of system performance and is therefore advantageously used as a cumulative measure of whether or not step size changes produce acceptable or non-acceptable results (lower or higher packet error rates). The step size change occurs independent of the equalizer operating modes, i.e., blind or decision-directed operating modes. Changing the step size may assist the equalizer to switch from the blind to the decision-directed operating mode.

Changing the equalizer step size permits trading off dynamic multi-path ("ghost") tracking performance to reduce the noise contribution by random inaccuracies in the filter coefficients. Larger step sizes allow the filter coefficients to change faster, so that the filter can adapt faster to dynamically changing multipath conditions. Small step sizes prevent the filter coefficients from changing rapidly. This reduces the noise level contributed by random fluctuations of the filter coefficients about their nominal values. This is particularly beneficial for terrestrial broadcast high definition television signal receivers due to the varying signal impairments under which the receiver must often operate.

In some cases, the factors limiting a receiver's performance include thermally generated white noise or static multipath. In other cases the factor limiting a receiver's performance is dynamic multipath. Under white noise and static multipath conditions, the filter coefficients need not adapt quickly when a steady-state operating condition has been reached, so the step size can be small. Under dynamic operating conditions, the filter coefficients need to adapt quickly to the changing multipath parameters. The disclosed system advantageously addresses these considerations by making a packet error measurement over an appropriate interval at the output of the FEC detector for an initial step size chosen for typically expected signal conditions. If the measured error rate is above an acceptable threshold, a different step size is set and another packet error measurement is made over the same time interval. For example, if a large step size was used initially, a smaller step size would be used for the second measurement. At the end of the two measurement intervals, the step size that produces the smaller error rate (as determined by controller 60) is used as long as a properly tuned, useable signal is present. This step size is retained until the next signal acquisition time, when the step size selection process is repeated.

This process may be tailored to suit the requirements of a particular system. For example, it may happen that there are fewer errors after the first step size change. In such case another step size reduction may be tried if it is available in a given system. If there are substantially the same amount of packet errors after the first step size reduction, a tie-breaker rule may be used. In such case the present system would use a larger step size to retain tracking qualities. However, a different system may use the lower step size if-it is deemed desirable to do so in accordance with the requirements of the system.

Figure 2:
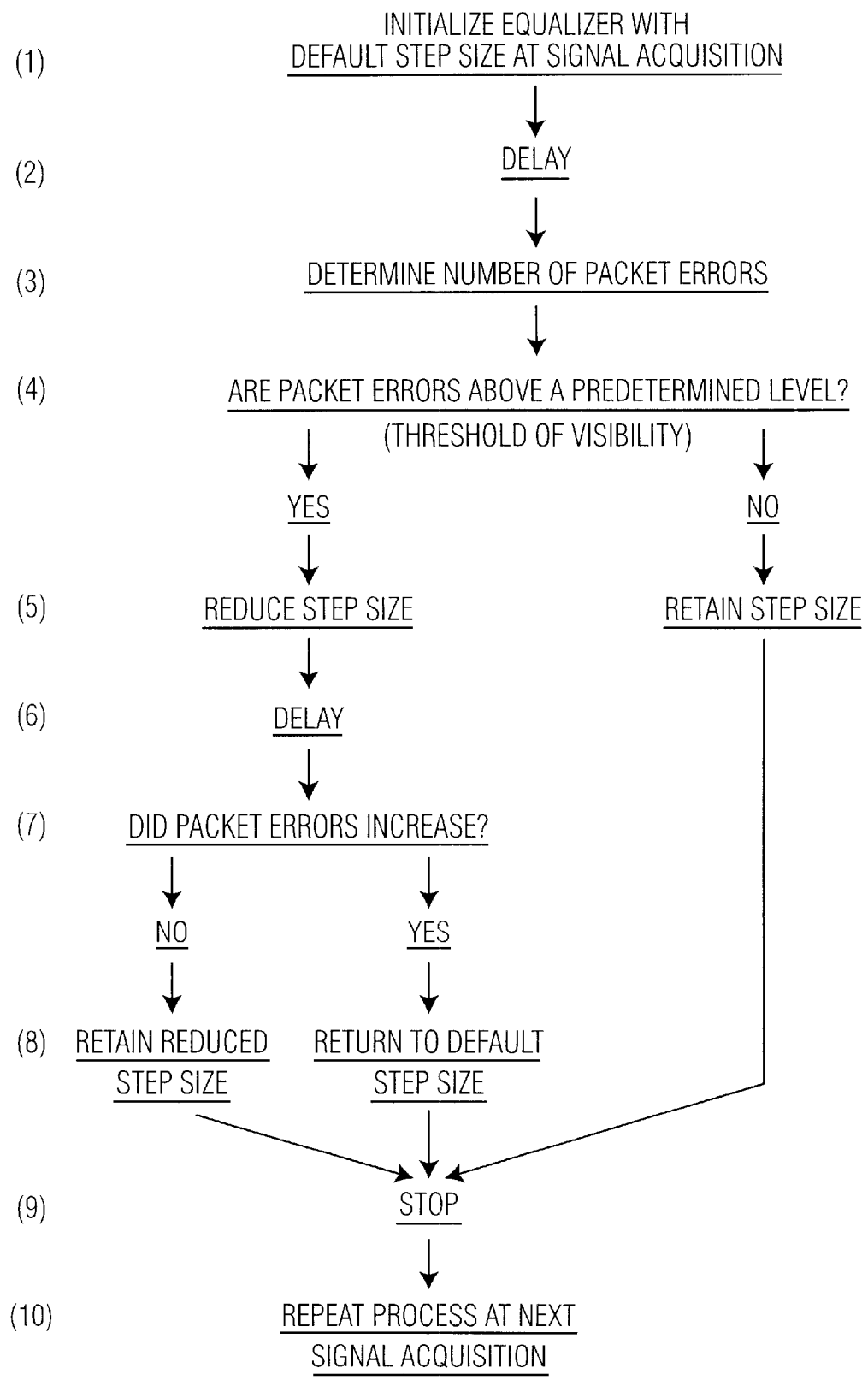
FIG. 2 is a flow chart illustrating the operation of the adaptive equalizer according to the principles of the invention.

More specifically, the equalizer coefficient step size is established in accordance with the method depicted by the flowchart shown in FIG. 2. In step (1), at the signal acquisition time, microcontroller 60 initializes the operation of equalizer 34 With a default step size that in this example is based on normally expected signal conditions at acquisition. After a predetermined delay (step 2) of about one second, microcontroller 60 queries FEC unit 44 to determine how many packet errors have been accumulated (step 3). The one second delay is a nominal delay. Other delays may be used in accordance with the requirements of a particular system. If the number of packet errors does not exceed the threshold of visibility, as determined empirically (step 4), the current equalizer coefficient step size is retained (step 5). Afterwards the process stops (step 9) until the next signal acquisition time (step 10).

If the number of packet errors exceeds the threshold of visibility (step 4), controller 60 instructs equalizer 34 to reduce its coefficient step size (step 5). After a predetermined delay (step 6), the microcontroller queries FEC unit 44 to determine if packet errors have increased (step 7). If the number of packet errors has increased, controller 60 causes the equalizer step size to return to the default step size (step 8). Otherwise the reduced step size is retained. The process then stops (step 9) until the next signal acquisition time (step 10).

This process may be tailored to suit the requirements of a particular system. For example, step 7 may determine that the number of packet errors did not increase and remains unchanged, or that the number of packet errors has decreased. If the packet errors decrease in step 7, another step size reduction may be tried if such is available (i.e., the smallest step size limit has not been reached). If the packet errors remain unchanged in step 7, a given system may employ a predetermined rule for using a larger or smaller step size.

What is claimed is:

1. In a system for processing a received signal containing an image representative datastream comprising a modulated signal containing data packets, a signal processing method comprising the steps of:

demodulating said received signal to produce a demodulated signal;

adaptively equalizing said demodulated signal to produce an equalized signal;

error detecting said equalized signal to detect packet errors in said equalized signal; and adjusting filter coefficient step values during said equalizing step as a function of said detected packet errors.

2. A method according to claim 1, wherein said received signal is a Vestigial Sideband (VSB) modulated signal containing high definition video information represented by a multiple level symbol constellation, said data having a data frame format constituted by a succession of data frames.

3. A method according to claim 1, wherein
said error detecting step comprises Reed-Solomon error detecting and correcting said equalized signal.

4. In a system for processing a received signal containing an image representative datastream containing data packets, a signal equalizing method comprising the steps of:
- (a) initializing an equalizer with a default coefficient step size;
- (b) determining the quantity of packet errors;
- (c) retaining the initial step size if the quantity of determined packet errors is not above a predetermined level;
- (d) reducing the coefficient step size if the quantity of determined packet errors is above the predetermined level;
- (e) determining if the quantity of packet error has increased after reducing the coefficient step size in step (d); and
- (f) returning to the default coefficient step size if the quantity of packet errors has increased after reducing the coefficient step size in step (d).

5. A method according to claim 4, wherein
said determining step involves determining the quantity of packet errors associated with the operation of a Reed-Solomon FEC detector.

* * * * *